United States Patent [19]

Munakata et al.

[11] Patent Number: 5,716,998
[45] Date of Patent: Feb. 10, 1998

[54] PRE-EXPANDED PARTICLES OF POLYPROPYLENE RESIN AND PROCESS OF PREPARING THE SAME

[75] Inventors: Yasumitsu Munakata, Settsu; Kenichi Senda, Hirakata, both of Japan

[73] Assignee: Kanegafuchi Kagaku Kogyo Kabushiki Kaisha, Osaka, Japan

[21] Appl. No.: 817,640

[22] PCT Filed: Oct. 27, 1995

[86] PCT No.: PCT/JP95/02216

§ 371 Date: Apr. 29, 1997

§ 102(e) Date: Apr. 29, 1997

[87] PCT Pub. No.: WO96/13543

PCT Pub. Date: May 9, 1996

[30] Foreign Application Priority Data

Oct. 31, 1994 [JP] Japan .................. 6-267509

[51] Int. Cl.⁶ .................................................. C08J 9/22
[52] U.S. Cl. ........................................... 521/58; 521/60
[58] Field of Search ..................................... 521/58, 60

[56] References Cited

FOREIGN PATENT DOCUMENTS

| | | |
|---|---|---|
| 58-129028 | 8/1983 | Japan . |
| 61-2741 | 1/1986 | Japan . |

*Primary Examiner*—Morton Foelak
*Attorney, Agent, or Firm*—Armstrong, Westerman, Westerman, Hattori, McLeland & Naughton

[57] ABSTRACT

Heat temperature at the expansion molding of a finished expanded article is decreased by lowering the melting peak temperature of the pre-expanded particles of a polypropylene resin. Comprising the polypropylene resin and a β-crystalline-nucleating agent, the percentage of the β-form in the whole crystalline region is 5 to 100 parts by weight.

13 Claims, 2 Drawing Sheets

PRE-EXPANDED PARTICLES OF POLYPROPYLENE RESIN AND PROCESS OF PREPARING THE SAME

TECHNICAL FIELDS

The present invention relates to pre-expanded particles comprising a polypropylene resin and a β-crystalline-nucleating agent, and a method of preparing thereof. And, further in detail, the present invention relates to pre-expanded particles of a polypropylene resin which contains a polypropylene crystal of β-form wherein the percentage of the crystal of β-form in the whole crystalline region is 5 to 100% by weight, which can lower substantially a peak temperature of a melting point, and relates to a process of preparing thereof. The pre-expanded particles thus obtained can provide a molded article superior in heat resistance, buffer property, strength, and rigidity.

BACKGROUND ART

Hitherto, the pre-expanded particles of a polypropylene resin particles have been well-known. For example, in JP-A-65734/1983, there is disclosed pre-expanded particles of polypropylene resin particles characterized in that a volatile foaming agent is contained in the polypropylene resin particle and pre-expansion is carried out by heating.

However, with respect to polypropylene homopolymer, block copolymer of propylene/ethylene and/or α-olefin, since the melting point of the resulting pre-expanded particles is so high as not less than 160° C., fusion with each pre-expanded particle becomes insufficient and an excellent molded article through molding within dies cannot be obtained.

Also, with respect to a random copolymer of propylene/ethylene and/or α-olefin which has been used for expansion-molded articles conventionally, since the melting point of the obtained pre-expanded particle is relatively high, and approximately 130° to 145° C., pre-expanded particles which can be used for molding within dies at a lower temperature has been required.

Here, when the pre-expanded particles are used for molding within dies, lowering a steam temperature leads to lowering a steam pressure, which is economically advantageous in such points that a clamping force of a molding machine can be designed to be low and that the molding can be carried out by using the molding machine of a low clamping force, and, further, which is economical in such a point that an amount of vapor per a shot is little.

As processes of preparing pre-expanded particles, in general, a method called as beads expanding method is adopted. This method is a method wherein resin particles and a volatile expanding agent dispersed in water are introduced into a pressure-resistive vessel, the resin particles are partially melted by heating the water dispersion up to a temperature around the melting point of the resin (a part of the crystal of the resin remains not-melted), the resin particles impregnated with the expanding agent are expanded by releasing at a given temperature and pressure into a lower pressure region, for example, atmospheric pressure to give the pre-expanded particles.

In the beads expanding method as described above, since the polypropylene resin particles are heated up to a temperature around the melting point thereof and a part of the crystal remains not-melted, there appear two regions in the crystalline region of the obtained pre-expanded particles, one region being a recrystallized region yielded by cooling the molten resin portion and the other region being a crystalline region yielded by thickening of not-melted crystal. And, when the endothermic peaks of the pre-expanding particle are measured by means of a differential scanning calorimetry (DSC), two endothermic peaks derived from the above-mentioned two crystalline regions are observed. The higher temperature side of the two peaks is derived from the crystalline region of the crystal of α-form yielded by the thickening and the lower temperature side is the crystalline region of the crystal of α-form yielded by the recrystallization. However, the peak of lower temperature side is of approximately the same temperature as the melting point of the original resin particle (referring to FIG. 2 hereinafter).

Conventionally, the pre-expanded particles within dies have been heated up, by means of a steam, to a temperature at which the crystal of the lower temperature side of the polypropylene resin pre-expanded particles having such double peaks of the α-form can be melted and the pre-expanded particles are fused with each other within dies to give a molded article.

However, each crystal is also the α-crystal form of the polypropylene resin and does not cause the substantial decrease of the melting point.

In JP-A-252429/1991, there are disclosed pre-expanded particles of polypropylene resin composition particles wherein a polypropylene resin and a quinacridone compound as the β-crystalline-nucleating agent are used. With respect to the pre-expanded particles described in this document, there are problems in such points that though the melting point thereof decreases slightly compared to the pre-expanded particle obtained from conventional polypropylene particles, the degree of the decrease is little and not sufficient to lower a temperature at the molding within dies (steam pressure) and, further, the pre-expanded particles are colored in red.

An object of the present invention is to produce the crystal of β-form of a polypropylene resin in pre-expanded particles, to lower substantially the peak temperature of the melting point and to lower the heating temperature at the molding within dies.

The present invention relates to the pre-expanded particles comprising a polypropylene resin and at least one kind of the β-crystalline-nucleating agent (hereinafter referred to as "the particular β-crystalline-nucleating agent") selected from the group consisting of dicarboxylic acid-type diamide compounds, diamine-type diamide compounds and amino acid-type diamide compounds, wherein the percentage of the β-form in the whole crystalline region is 5 to 100% by weight.

The pre-expanded particles, preferably have a closed cell ratio of not less than 60%.

Those pre-expanded particles are obtained by producing polypropylene resin particles containing a β-crystalline-nucleating agent obtained by introducing a particular β-crystalline-nucleating agent into a polypropylene resin, heating an aqueous dispersion comprising the polypropylene resin particles containing the β-crystalline-nucleating agent and a dispersing agent and a volatile foaming agent in a pressure-resistive vessel to melt the crystal of the polypropylene resin in the resin particles, then, maintaining the aqueous dispersion within a temperature range from a temperature of not higher than a temperature at which the molten particles have a melt viscosity enough to give a closed cell ratio of the pre-expanded particles of not less than 60% to a temperature of higher than a temperature at which the molten particles are crystallized, releasing the aqueous dispersion into atmosphere where a pressure is below a vapor pressure of the volatile foaming agent while maintaining the temperature and pressure in the pressure-resistive vessel within a range of cool temperature and under a pressure above the vapor pressure of the volatile foaming agent, respectively. According to the process of the present invention, the crystal of β-form can be produced in the pre-expanded particles with excellent repeatability. Also, this process is effective in case when the quinacridone compound is used as the β-crystalline-nucleating agent.

BEST MODE FOR CARRYING OUT THE INVENTION

The crystal of β-form in the present invention is one of the crystalline forms of polypropylene, and it is known that the β-form is produced under controlled conditions or by adding a nucleating agent. Among the crystalline forms of polypropylene, generally the most stable crystalline form is the α-form. The melting point of the crystal of β-form is lower than that of the α-form by not less than 10° C. (generally about 15° C. lower). This is assumed that the crystal of β-form is unstable in energy state as compared with the α-form.

The β-crystalline-nucleating agent in the present invention is a low molecular compound which, by introducing into the polypropylene, has an effect to produce a large amount of the crystal of β-form with the controlled thermal history.

As the β-crystalline-nucleating agents there are preferably used in the present invention, for example, dicarboxylic acid-type diamide compounds, amino acid-type diamide compounds and diamine-type diamide compounds and the like, as described in JP-A-255551/1993, JP-A-292936/1993, JP-A-310665/1993, JP-A-64038/1994 and JP-A-107875/1994. They are preferable in such points that an effect due to the use of the β-crystalline-nucleating agent, i.e. the amount of the crystalline region of a low melting point resulted from the β-form is easy to be controlled and that the coloring of the pre-expanded particle of the polypropylene resin never occurs. These agents can be used alone or in admixture of two or more.

As the preferable β-crystalline-nucleating agent, for example, the following compounds can be cited.

(1) Dianilide Compounds (Refer to JP-A-255551/1993)

Dianilide adipate, dianilide suberate or both.

(2) Diamide Compounds (I) (Refer to JP-A-310665/1993)

Dicarboxylic acid-type diamide compounds represented by the general formula (I):

$$R^1-NHCO-X-CONH-R^2 \quad (I)$$

wherein X is or , $R^1$ and $R^2$ are the same or different, and each is a cycloalkyl group having 5 to 12 carbon atoms.

Concretely, there can be cited reaction products of naphthalenedicarboxylic acid or biphenyldicarboxylic acid with cycloalkyl monoamines, for example, cyclopentyl amine, cyclohexyl amine, cycloheptyl amine, cyclooctyl amine, cyclododecyl amine and the like. And, particularly, N,N'-dicyclopentyl-2,6-naphthalenedicarboxy amide, N,N'-dicyclohexyl-2,6-naphthalenedicarboxy amide, N,N'-dicyclooctyl-2,6-naphthalenedicarboxy amide, N,N'-dicyclododecyl-2,6-naphthalenedicarboxy amide, N,N'-dicyclohexyl-2,7-naphthalenedicarboxy amide, N,N'-dicyclopentyl-4,4'-biphenyldicarboxy amide, N,N'-dicyclohexyl-4,4'-biphenyldicarboxy amide, N,N'-dicyclooctyl-4,4'-biphenyldicarboxy amide, N,N'-dicyclododecyl-4,4'-biphenyldicarboxy amide, N,N'-dicyclohexyl-2,2'-biphenyldicarboxy amide and the like are preferable.

(3) Diamide Compounds (II) (refer to JP-A-107875/1994)

Diamine-type diamide compounds represented by the general formula (II):

$$R^4-CONH-R^3-NHCO-R^5 \quad (II)$$

wherein $R^3$ is an aliphatic diamine residue having 1 to 24 carbon atoms, an alicyclic diamine residue having 6 to 21 carbon atoms or an aromatic diamine residue having 6 to 15 carbon atoms, $R^4$ and $R^5$ are the same or different and each is a cycloalkyl group having 3 to 14 carbon atoms, a cycloalkenyl group having 3 to 14 carbon atoms, wherein each of $R^6$ and $R^7$ is hydrogen atom or a linear or branched alkyl group or alkenyl group having 1 to 4 carbon atoms, each of $R^8$ and $R^9$ is a linear or branched alkylene group having 1 to 3 carbon atoms.

Concretely, there can be cited reaction products of aliphatic diamines, alicyclic diamine or aromatic diamines with monocarboxylic acids.

As the aliphatic diamines, there can be cited for example, the compounds represented by the general formula:

$$H_2N-R^{10}-NH_2$$

wherein $R^{10}$ is a saturated or unsaturated alkylene group having 1 to 24 carbon atoms. Preferably, 1,2-diaminopropane, 1,3-diaminopropane, 1,4-diaminobutane, 1,3-diaminopentane, 1,5-diaminopentane, 1,6-diaminohexane and the like can be exemplified.

As the alicyclic diamines, there can be cited for example, the compounds represented by the general formula:

$$H_2N-R^{11}-NH_2$$

wherein $R^{11}$ is or wherein $R^{12}$ and $R^{13}$ are the same or different and each is an alkylene group having 1 to 3 carbon atoms, $R^{14}$ and $R^{15}$ are the same or different and each is hydrogen atom or an alkyl group having 1 to 4 carbon atoms. Preferable alicyclic diamines are 1,2-diaminocyclohexane, 1,4-diaminocyclohexane, 4,4'-diaminodicyclohexylmethane, 4,4'-diamino-3,3'-dimethyldicyclohexylmethane, 1,3-bis(aminomethyl)cyclohexane, 1,4-bis(aminomethyl)cyclohexane, and also isophorondiamine and menthenediamine.

As the aromatic diamines, there can be cited the compounds represented by the general formula:

wherein $R^{16}$ is wherein Y is —$CH_2$—, —O—, —$SO_2$—, —S—, —CO— or —$C(CH_3)_2$—, preferably, o-phenylenediamine, m-phenylenediamine, p-phenylenediamine, 1,5-diaminonaphthalene, 4,4'-diaminodiphenylmethane, 4,4'-diaminodiphenyl ether, 4,4'-diaminodiphenyl sulfone and the like.

As the monocarboxylic acid, there can be cited for example, phenylacetic acid, cyclohexylacetic acid, cyclopropanecarboxylic acid, cyclobutanecarboxylic acid, cyclopentanecarboxylic acid, cyclohexanecarboxylic acid, 2-methylcyclohexanecarboxylic acid, 3-methylcyclohexane-carboxylic acid, 4-methylcyclohexanecarboxylic acid, 4-tert-butylcyclohexanecarboxylic acid, benzoic acid, o-methylbenzoic acid, m-methylbenzoic acid, p-methylbenzoic acid, p-ethylbenzoic acid, p-butylbenzoic acid, p-tert-butylbenzoic acid and the like.

As the particularly preferable diamine compounds (II), there can be exemplified for example, N,N'-dicyclohexanecarbonyl-p-phenylenediamine, N,N'-dibenzoyl-1,5-diaminonaphthalene, N,N'-dibenzoyl-1,4-diaminocyclohexane, N,N'-dicyclohexanecarbonyl-1,4-diaminocyclohexane and the like.

(4) Diamide Compounds (III) (Refer to JP-A-262936/1993)

Dicarboxylic acid-type diamide compounds (IIIa) represented by the general formula (IIIa):

$R^{18}$—NHCO—$R^{17}$—CONH—$R^{19}$ (IIIa)

wherein $R^{17}$ is a saturated or unsaturated aliphatic dicarboxylic acid residue having 1 to 28 carbon atoms, an alicyclic dicarboxylic acid residue having 6 to 30 carbon atoms or an aromatic dicarboxylic acid residue having 6 to 30 carbon atoms, $R^{18}$ and $R^{19}$ are the same or different and each is a cycloalkyl group having 3 to 18 carbon atoms, a cycloalkenyl group having 3 to 18 carbon atoms, wherein $R^{20}$ and $R^{21}$ are a linear or branched alkyl group, alkenyl group, cycloalkyl group or phenyl group having 1 to 12 carbon atoms, $R^{22}$ and $R^{23}$ are a linear or branched alkylene group having 1 to 4 carbon atoms, or amino acid-type diamide compounds (IIIb) represented by the general formula (IIIb):

$R^{25}$—CONH—$R^{24}$—CONH—$R^{26}$ (IIIb)

wherein $R^{24}$ is a saturated or unsaturated aliphatic amino acid residue having 1 to 28 carbon atoms, an alicyclic amino acid residue having 6 to 30 carbon atoms or an aromatic amino acid residue having 6 to 30 carbon atoms, $R^{25}$ and $R^{26}$ are the same or different and each is a cycloalkyl group having 3 to 18 carbon atoms, cycloalkenyl group having 3 to 18 carbons atoms, wherein $R^{27}$ is hydrogen atom, a linear or branched alkyl group, alkenyl group, cycloalkyl group or phenyl group having 1 to 12 carbon atoms, $R^{28}$ is a linear or branched alkyl group, alkenyl group, cycloalkyl group or phenyl group having 1 to 12 carbons, $R^{29}$ and $R^{30}$ are a linear or branched alkylene group having 1 to 4 carbon atoms.

Concretely, as the dicarboxylic acid-type diamide compound (IIIa), there can be cited for example, compounds obtained by amidating aliphatic, alicyclic or aromatic dicarboxylic acids with alicyclic or aromatic monoamines.

As the aliphatic dicarboxylic acid, there can be exemplified for example, malonic acid, diphenylmalonic acid, succinic acid, phenylsuccinic acid, diphenylsuccinic acid, glutaric acid, 3,3-dimethylglutaric acid, adipic acid, pimelic acid, suberic acid, azelaic acid, sebacic acid, 1,12-dodecanedicarboxylic acid, 1, 14-tetradecanedicarboxylic acid, 1,18-octadecanedicarboxylic acid and the like.

As the alicyclic dicarboxylic acids, there can be exemplified for example, 1,2-cyclohexanedicarboxylic acid, 1,4-cyclohexanedicarboxylic acid, 1,4-cyclohexanediacetic acid and the like.

As the aromatic dicarboxylic acids, there can be exemplified for example, aromatic dibasic acids such as p-phenylenediacetic acid, p-phenylenediethanoic acid, phthalic acid, 4-tert-butylphthalic acid, isophthalic acid, 5-tert-butylisophthalic acid, terephthalic acid, 1,8-naphthalic acid, 1,4-naphthalenedicarboxylic acid, 2,6-naphthalenedicarboxylic acid, 2,7-naphthalenedicarboxylic acid, diphenic acid, 3,3'-biphenyldicarboxylic acid, 4,4'-biphenyldicarboxylic acid, 4,4'-binaphthyldicarboxylic acid, bis(3-carboxyphenyl) methane, bis(4-carboxyphenyl) methane, 2,2-bis(3-carboxyphenyl)propane 2,2-bis(4- carboxyphenyl) propane, 3,3'-sulfonyldibenzoic acid, 4,4'-sulfonyldibenzoic acid, 3,3'-oxydibenzoic acid, 4,4'-oxydibenzoic acid, 3,3'-carbonyldibenzoic acid, 4,4'-carbonyldibenzoic acid, 3,3'-thiodibenzoic acid, 4,4'-thiodibenzoic acid, 4,4'-(p-phenylenedioxy)dibenzoic acid, 4,4'-isophthaloyldibenzoic acid, 4,4'-terephthaloyldibenzoic acid, and dithiosalicylic acid.

As the alicyclic monoamines, there can be exemplified for example, cyclopropylamine, cyclobutylamine, cyclopentylamine, cyclohexylamine, 2-methylcyclohexylamine, 3-methylcyclohexylamine, 4-methylcyclohexylamine, 2-ethylcyclohexylamine, 4-ethylcyclohexylamine, 2-propylcyclohexylamine, 2-isopropylcyclohexylamine, 4-propylcyclohexylamine, 4-isopropylcyclohexylamine, 2-tert-butylcyclohexylarnine, 4-n-butylcyclohexylamine, 4-isobutylcyclohexylamine, 4-sec-butylcyclohexyl amine, 4-tert-butylcyclohexylamine, 4-n-amylcyclohexylamine, 4-isoamylcyclohexylamine, 4-sec-amylcyclohexylamine, 4-tert-amylcyclohexylamine, 4-hexylcyclohexylamine, 4-heptylcyclohexylamine, 4-octylcyclohexylamine, 4-nonylcyclohexylamine, 4-decylcyclohexylamine, 4-undecylcyclohexylamine, 4-dodecylcyclohexylamine, 4-cyclohexylcyclohexylamine, 4-phenylcyclohexylamine, cycloheptylamine, cyclododecylamine, cyclohexylmethylamine, α-cyclohexylethylamine, β-cyclohexylethylamine, α-cyclohexylpropylamine, β-cyclohexylpropylamine, γ-cyclohexylpropylamine and the like can be exemplified.

As the aromatic monoamine, for example, aniline, o-toluidine, m-toluidine, p-toluidine, o-ethylaniline, p-ethylaniline, o-propylaniline, m-propylaniline, p-propylaniline, o-cumidine, m-cumidine, p-cumidine, o-tert-butylaniline, p-n-butylaniline, p-isobutylaniline, p-sec-butylaniline, p-tert-butylaniline, p-n-amylaniline, p-isoamylaniline, p-sec-amylaniline, p-tert-amylaniline, p-hexylaniline, p-heptylaniline, p-octylaniline, p-nonylaniline, p-decylaniline, p-undecylaniline, p-dodecylaniline, p-cyclohexylaniline, o-aminodiphenyl, m-aminodiphenyl, p-aminodiphenyl, p-aminostyrene, benzineamine, α-phenylethylamine, β-phenylethylamine, α-phenylpropylamine, β-phenylpropylamine, γ-phenylpropylamine and the like.

As the amino acid-type diamide compounds (IIIb), there can be cited for example, compounds obtained by amidating aliphatic, alicyclic or aromatic amino acids with monocarboxylic acids and monoamines.

As the aliphatic amino acids, there can be exemplified for example, aminoacetic acid, α-aminopropionic acid, β-aminopropionic acid, α-aminoacrylic acid, α-aminobutylic acid, β-aminobutylic acid, γ-aminobutylic acid, α-amino-α-methylbutylic acid, γ-amino-α-methylenebutylic acid, α-aminoisobutylic acid, β-aminoisobutylic acid, α-amino-n-valeric acid, δ-amino-n-valeric acid, β-aminocrotonic acid, α-amino-β-methylvaleric acid, α-aminoisovaleric acid, 2-amino-4-pentenoic acid, α-amino-n-caproic acid, 6-aminocaproic acid, α-aminoisocaproic acid, 7-aminoheptanoic acid, α-amino-n-caprylic acid, 8-arninocaprylic acid, 9-aminononanoic acid, 11-aminoundecanoic acid, 12-aminododecanoic acid and the like.

As the alicyclic amino acids, there can be exemplified for example, 1-aminocyclohexanecarboxylic acid, 2-aminocyclohexanecarboxylic acid, 3-aminocyclohexanecarboxylic acid, 4-aminocyclohexanecarboxylic acid, p-aminomethylcyclohexanecarboxylic acid, 2-amino-2-norbornanecarboxylic acid and the like.

As the aromatic amino acids, there can be exemplified for example, α-aminophenylacetic acid, α-amino-β-phenylpropionic acid, 2-amino-2-phenylpropionic acid, 3-amino-3-phenylpropionic acid, α-aminocinnamic acid, 2-amino-4-phenylbutylic acid, 4-amino-3-phenylbutylic acid, anthranilic acid, m-aminobenzoic acid, p-aminobenzoic acid, 2-amino-4-methylbenzoic acid, 2-amino-6-methylbenzoic acid, 3-amino-4-methylbenzoic acid, 2-amino-3-methylbenzoic acid, 2-amino-5-methylbenzoic acid, 4-amino-2-methylbenzoic acid, 4-amino-3-methylbenzoic acid, 2-amino-3-methoxybenzoic acid, 3-amino-4-methoxybenzoic acid, 4-amino-2-methoxybenzoic acid, 4-amino-3-methoxybenzoic acid, 2-amino-4,5-dimethoxybenzoic acid, o-aminophenylacetic acid, m-aminophenylacetic acid, p-aminophenylacetic acid, 4-(4-aminophenyl)butylic acid, 4-aminomethylbenzoic acid, 4-aminomethylphenylacetic acid, o-aminocinnamic acid, m-aminocirmamic acid, p-aminocinnamic acid, p-aminohippuric acid, 2-amino-1-naphthoic acid, 3-amino-1-naphthoic acid, 4-amino-1-naphthoic acid, 5-amino-1-naphthoic acid, 6-amino-1-naphthoic acid, 7-amino-1-naphthoic acid, 8-amino-1-naphthoic acid, 1-amino-2-naphthoic acid, 3-amino-2-naphthoic acid, 4-amino-2-naphthoic acid, 5-amino-2-naphthoic acid, 6-amino-2-naphthoic acid, 7-amino-2-naphthoic acid, 8-amino-2-naphthoic acid and the like.

As the alicyclic carboxylic acids, there can be exemplified for example, cyclopropanecarboxylic acid, cyclobutanecarboxylic acid, cyclopentanecarboxylic acid, 1-methylcyclopentanecarboxylic acid, 2-methylcyclopentanecarboxylic acid, 3-methylcyclopentanecarboxylic acid, 1-phenylcyclopentanecarboxylic acid, cyclopentenecarboxylic acid, cyclohexanecarboxylic acid, 1-methylcyclohexanecarboxylic acid, 2-methylcyclohexanecarboxylic acid, 3-methylcyclohexanecarboxylic acid, 4-methylcyclohexanecarboxylic acid, 4-propylcyclohexanecarboxylic acid, 4-butylcyclohexanecarboxylic acid, 4-pentylcyclohexanecarboxylic acid, 4-hexylcyclohexanecarboxylic acid, 4-phenylcyclohexanecarboxylic acid, 1-phenylcyclohexanecarboxylic acid, cyclohexenecarboxylic acid, 4-butylcyclohexenecarboxylic acid, cycloheptanecarboxylic acid 1-cycloheptenecarboxylic acid, 1-methylcycloheptanecarboxylic acid, 4-methylcycloheptanecarboxylic acid, cyclohexylacetic acid and the like.

As the aromatic monocarboxylic acids, there can be exemplified for example, benzoic acid, o-methyl-benzoic acid, m-methyl-benzoic acid, p-methyl-benzoic acid, p-ethylbenzoic acid, p-propylbenzoic acid, p-butylbenzoic acid, p-tert-butylbenzoic acid, p-pentylbenzoic acid, p-hexylbenzoic acid, o-phenylbenzoic acid, p-phenylbenzoic acid, p-cyclohexylbenzoic acid, phenylacetic acid, phenylpropionic acid, phenylbutyric acid and the like.

And, as the monoamines, the monoamines usable for the dicarboxylic acid-type diamide compounds (IIIa) can be exemplified.

As the particularly preferable examples of the dicarboxylic acid-type diamide compound (IIIa), there can be cited for example, N,N'-dicyclohexylterephthalamide, N,N'-dicyclohexyl-1,4-cyclohexanedicarboxyamide, N,N'-dicyclohexyl-2,6-naphthalenedicarboxyamide, N,N'-dicyclohexyl-4,4'-biphenyldicarboxyamide and the like.

As the particularly preferable examples of the amino acid-type diamide compound (IIIb), there can be cited for example, N,N'-bis(p-methylphenyl)hexanediamide, N,N'-bis(p-ethylphenyl)hexanediamide, N,N'-bis(4-cyclohexylphenyl)hexanediamide, p-(N-cyclohexanecarbonylamino)benzoic acid cyclohexylamide, δ-(N-benzoylamino)-n-valeric acid anilide and the like.

As the polypropylene resin used in the present invention, there can be cited a crystalline polymer such as propylene homopolymer or a copolymer of propylene and ethylene and/or α-olefin, a mixture of at least one of the copolymer of propylene and ethylene and/or α-olefin and the propylene homopolymer. Preferable propylene copolymer is one containing not less than 75% by weight, particularly not less than 90% by weight of propylene in such a point that the characteristics of the propylene unit are not lost. The copolymer may be in the form of either block copolymer or random copolymer. As the copolymerizable monomers one or more of α-olefins having 2 or 4 to 10 carbon atoms such as ethylene, butene-1, isobutene, pentene-1,3-methyl-butene-1, hexene-1,4-methyl-pentene-1,3,4-dimethyl-butene-1, heptene-1,3-methyl-hexene-1, octene-1 and decene-1; vinyl monomers such as vinyl chloride, vinylidene chloride, vinyl acetate, ethyl acrylate, methyl methacrylate, maleic anhydride and styrene; diene monomers such as 5-ethylidene-2-norbornene, 5-methylene-2-norbornene and 1,4-hexadiene; and the like. Among them, ethylene and the α-olefin are preferable in such a point of cost, and among them, ethylene, butene-1, isobutene, pentene-1 and hexene-1 are preferable in such a point that the characteristics of polypropylene resin such as rigidity and heat resistance are kept. With respect to the mixing mount, when at least one kind of the copolymers of propylene and ethylene and/or α-olefin are mixed with propylene homopolymer, it is preferable that propylene homopolymer is 75 to 95% by weight in such a point that the properties of propylene homopolymer are not lost.

If necessary, other resins may be blended in such an amount that the effects of the present invention are not lost. Examples of the other resins are for example, polyethylene; ethylene/vinyl copolymers of ethylene and a vinyl monomer such as vinyl acetate, vinyl chloride, vinylidene chloride, ethyl acrylate, methyl methacrylate, maleic anhydride or styrene; ethylene/propylene copolymers which have a propylene content of less than 75% by weight; ethylene/propylene/diene ternary copolymers which have a propylene content of less than 75% by weight; (hydrogenated)styrene/butadiene random copolymer; (hydrogenated)styrene/butadiene/styrene block copolymer; polybutene; polypentene; ionomer; polymethylpentene; ethylene/cyclic olefin copolymers; polyisobutene; polybutadiene; polyisoprene and the like.

It is preferable that a melt index (MI) of the polypropylene resin is within the range from 0.1 g/min to 10 g/min determined according to the testing method of ASTM-D 1238. And, it is further preferable that the MI value is within the range from 1 g/min to 4 g/min. If the MI value is less than 0.1 g/min, the resulting molded article from the pre-expanded particles has space between the particles and has uneven surface. If the MI value is more than 10 g/min, the closed cell ratio of the pre-expanded particles is lowered and mechanical strength of the resulting molded article tends to decrease.

The closed cell ratio defined in the present invention is a percentage of closed cells (cells which are closed and isolated from each other with isolating walls. The expansion ratio means magnitude of expansion defined by the ratio of a volume of expanded particle to that of resin particle before expansion. These measurements are carried out as the followings.

Closed cell rate (%)=(v−W/d)/V×100
Expansion ratio=V(W/d)
d: density of resin (g/cm$^3$)
W: weight (g) of expanded particle sample
V: volume of expanded particle sample (volume measured by being in ethanol) (cm$^3$)
v: true volume (cm$^3$) of expanded particle sample measured by means of an air comparison pycnometer (for example, air comparison pycnometer Model 930 manufactured by TOSHIBA BECKMAN Inc.

It is preferable that the expansion ratio of the polypropylene resin expanded particle containing the crystal of β-form is within the range from 5 to 100 times and, further, within the range of 10 to 70 times. If the expansion ratio is less than 5 times, it is not preferable for obtaining a practical molded article. If the expansion ratio is more than 100 times, it is not preferable because the closed cell ratio becomes less than 60% and practical properties of molded article such as compression strength are decreased.

It is preferable that the closed cell ratio of the polypropylene resin pre-expanded particle containing the β-crystalline-nucleating agent is not less than 60% and, further, not less than 90%. If the closed cell ratio is less than 60%, it is not preferable because practical properties of molded article such as compression strength are decreased.

It is preferable that the β-crystalline-nucleating agent is contained in the polypropylene pre-expanded particles in an amount of 0.0001 to 10 parts by weight per 100 parts by weight of the polypropylene resin, particularly 0.001 to 1 part by weight. If the amount of the β-crystalline-nucleating agent is too small, the production of the crystal of β-form is little and the peak of the melting point at lower temperature side becomes small. On the other hand, when the mount of the β-crystalline-nucleating agent is more than 10 parts by weight, though no substantial difference in the amount of the produced crystal of β-form is observed and the size of the peak of the melting point at lower temperature side is not considerably changed, it is economically disadvantageous.

The pre-expanded particles of the present invention are obtained by mixing the β-crystalline-nucleating agent to the polypropylene resin and by introducing a foaming agent, followed by expanding.

As the method of mixing the β-crystalline-nucleating agent with the polypropylene resin, for example, there is a method wherein the β-crystalline-nucleating agent is blended during the preparation (polymerization) of the polypropylene resin, a method wherein the polypropylene resin and the β-crystalline-nucleating agent are blended in the molten state, and the like.

To this composition of the polypropylene resin and β-crystalline-nucleating agent are added, if occasion demands, additives such as a nucleating agent, stabilizing agent, antioxidant, ultraviolet absorbing agent, lubricant, antiblocking agent, filler, coloring agent, neutralizer, antistatic agent, acid reducing agent, luminous whitening agent and antibacterial agent. The amount thereof to be admixed is such an amount that the effects of the present invention are not lost.

The resin composition of the polypropylene resin and β-crystalline-nucleating agent is generally prepared in the form of particle or pellet and is subjected to the pre-expansion process. At the pre-expansion, first a volatile foaming agent is introduced into the particles or pellets of the resin composition. As the introducing method, conventionally well-known methods are adopted. Nonrestrictive examples are a liquid phase method wherein the particles or pellets are impregnated with a foaming agent in the state of liquid, a gas phase method wherein the particles or pellets are impregnated with a foaming agent in the state of gas, an aqueous dispersion method wherein the particles or pellets are impregnated with a foaming agent in the state that the particles or pellets are dispersed in water, a melt-extrusion method wherein the particles or pellets are impregnated with a foaming agent in the state that the particles or pellets are melted in an extruder, and the like.

Examples of the preferable volatile foaming agent are, for example, aliphatic hydrocarbons such as butane, pentane, hexane, propane and heptane; alicyclic hydrocarbons such as cyclopentane, cyclohexane and cyclobutane; halide hydrocarbons such as dichlorodifluoromethane, dichlorofluoromethane, trichlorofluoromethane, chloromethane, dichloromethane, chloroethane, dichlorotetrafluoroethane, trichlorotrifluoroethane and perfluorocyclobutane; admixture thereof; and the like. The content of the foaming agent is determined according to the kind of the foaming agent and the desired expansion ratio, in general, is preferably 1 to 50 parts per 100 parts of the resin composition.

As the pre-expansion method, there may be employed, for example, a method wherein expansion is carried out by pressurizing the particles or pellets impregnated with a foaming agent in a pressure-resistive vessel, and then depressurizing (JP-A-207942/1984), a method wherein the polypropylene resin in the molten state which is impregnated with a foaming agent in an extruder is extruded and expanded to obtain strands which are then chopped (JP-A-76230/1983), a method wherein expansion is carried out by dispersing the particles or pellets impregnated with a foaming agent in water, and then releasing the particles or pellets into an atmospheric pressure (beads expanding method), a method wherein expansion is carried out by introducing a volatile foaming agent into the resin particles, and then heating them (JP-A-65734/1983), and the like. In any of the above-mentioned methods, the particles or pellets of the resin composition are heated up to around the peak temperature of the melting point and are pre-expanded. However, there are some cases where the resin is not completely melted in the above-mentioned preparation methods or the cooling rate at the expansion is not suitable for producing the β-form. For increasing the production of the crystal of β-form, it is preferable that the pre-expanded particles of a high temperature are gradually cooled. The cooling rate can be set up optionally according to the pre-expanding method and is, preferably, approximately 1° to 200° C./min, particularly 5° to 100° C./min. If the cooling rate is less than 1° C./min, the β-form tends to decrease in the polypropylene resin having a high MI. And, if the cooling rate is more than 200° C./min, the production of the α-form tends to take priority. For gradually cooling, there is employed a method wherein the atmospheric temperature at the expansion is kept to be more than room temperature by means of hot air, hot water, vapor and the like. And, there may be employed a method wherein once-cooled pre-expanded particles are heated again until the crystals of α-form of the polypropylene resin are melted partially, and then are cooled gradually under the same conditions as in the above.

The pre-expanded particles of the present invention can be given in the form of particle which is obtained from the particles or pellets as they are or which is obtained from chopped strands prepared through the extrusion method.

According to the above-mentioned conventional process of producing the pre-expanded particle, the polypropylene resin particles containing the crystal of β-form can be obtained. However, the repeatability, yield and the regulation of the β-form content is not so good.

This is considered as follows: it is known that the β-form is converted to the α-form by stretching (for example, by Fujiyama, "Kobunshi Kako", 38, page 3, 35 (1989)). In the conventional methods, for example, the since above-mentioned beads expansion method, the polypropylene particles in the pressure-resistive vessel are heated up to around the melting point thereof, the crystals (β-form) remain partially. Therefore, if the polypropylene particles are released into atmosphere and pre-expanded, the remaining crystal of α-form causes tention which acts to inhibit the production of β-form during crystallization of β-form in the pre-expanded particles, or acts to convert the once produced crystal of β-form to α-form. As a result, it is difficult to provide the pre-expanded particle having a stable β-form content.

In order to provide the pre-expanded particle containing the crystal of β-form at a high content with excellent repeatability, the following method may be employed.

Namely, in the above-mentioned beads expansion method, first, in a pressure-resistive vessel, an aqueous dispersion of the resin particles comprising the dispersing agent and the volatile foaming agent is heated up to a temperature at which the resin particles containing the β-crystalline-nucleating agent are melted. Namely, the aqueous dispersion is heated up to a temperature at which the crystals in the resin particles are melted substantially resin completely, but the particles containing the β-crystalline-nucleating agent keeps their particle shape. Then, the aqueous dispersion is cooled, with keeping their particle form, to a temperature at which the crystallization of the molten resin particles does not proceed. And then, with maintaining the inside of the pressure-resistive vessel at that temperature and maintaining the inside pressure of the vessel at a pressure higher than the vapor pressure of the volatile foaming agent, the aqueous dispersion is released to a lower pressure atmosphere. According to this method, polyolefin resin pre-expanded particles containing the crystals of β-form can be produced stably.

It is necessary that the temperature to which the resin particle are cooled for expansion, when the molten resin particles are molded into pre-expanded particles, is within the range from a temperature of not higher than a temperature at which the molten particle have a melt viscosity enough to give a closed cell ratio of the pre-expanded particle of not less than 60% to a temperature of higher than a temperature at which the molten particles are crystallized through cooling (110° to 140° C.; generally such a temperature being 90° to 120° C. in the system where a β-crystalline-nucleating agent is not added, but the temperature for crystallization rises when the β-crystalline-nucleating agent is added). The concrete temperature range, which varies with the kind or MI of the resin particle, is a range of a temperature higher than 110° C., preferably a range of not lower than 120° C. and not higher than 160° C.

At a temperature lower than 110° C., the crystallization proceeds and the expansion ratio of the pre-expanded particle is lowered below the desired ratio and, simultaneously, the distribution of the ratio becomes easily uneven. And, at a temperature higher than 160° C., the closed cell ratio of the pre-expanded particles is less than 60%, and the mechanical properties such as compression strength and tensile strength or the thermal insulating effect of the molded article is easy to be decreased.

The expansion ratio of the pre-expanded particles can be optionally varied by changing the temperature and an amount of the volatile foaming agent to be introduced into the vessel, and the production of polypropylene resin pre-expanded particles containing the crystal of β-form in a content from a low ratio to an ultra high ratio is possible. Particularly, in the conventional method (beads expansion method) wherein the resin particles subjected to partial melting of the crystal is impregnated with the volatile foaming agent and is released to a lower pressure atmosphere, there is a limitation with respect to the expansion ratio because the crystals are not wholely melted. According to the present invention, the expansion ratio can also be further increased.

According to this particular beads expansion method, an excellent formation of the crystal of β-form can be achieved even when the quinacridone compounds are used as the β-crystalline-nucleating agent.

Examples of the quinacridon compounds used as the β-crystalline-nucleating agent are ones described in JP-A-252429/1991.

For example, there are the compounds represented by the following formulae (IVa), (IVb), (IVc), (IVd) and (IVe) wherein R is hydrogen atom, an alkyl group, an aromatic group, a halogen atom or an alkoxy group, n is 0, 1 or 2, M is a monovalent metal, M' is the same as M or a hydrogen atom, M" is a bivalent metal.

The concrete examples of these compounds are as follows:

Compounds (IVa):
Quinacridone, 2,9- or 4,11-dimethylquinacridone, 2,4,9,11-tetrachloroquinacridone, 2,9-dibromoquinacridone, 2,9-dichloroquinacridone, 2,9-or 4,11-dimethoxyquinacridone, dibenzo[a,e]quinacridone, and the like.

Compounds (IVb):
Quinacridonequinone, 2,9-dimethylquinacridonequinone, 2,9-dichloroquinacridonequinone, 4,11-dibromoquinacridonequinone, 1,8-dimethoxyquinacridonequinone, dibenzo[a,e]quinacridonequinone, and the like.

Compounds (IVc):
6,13-dihydroquinacridone, 2,9-dichloro-6,13-dihydroquinacridone, 4,11-dimethoxy-6,13-dihydroquinacridone, 2,4,9,11-tetrachloro-6,13-dihydroquinacridone, 2,3-, 9,10-dibenz-6,13-dihydroquinacridone, 3, 4-, 10,11,-dibenz-6,13-dihydroquinacridone, and the like.

As the metal M of the compounds (IVd), potassium, sodium and the like are preferable, and as the metal M' of the compounds (IVe), copper, zinc, nickel, iron or the like can be cited.

It is preferable that in the polypropylene resin pre-expanded particle containing the crystal of $\beta$-form, the percentage of the $\beta$-form in the whole crystalline region is regulated to 5 to 100% by weight, more preferably 30 to 70% by weight. When the percentage of the $\beta$-form is less than 5% by weight, the percentage of the $\beta$-form after the preparation of the pre-expanded particle becomes small and in case that the molding within dies is carried out, fusion among the pre-expanded particles becomes poor and thus strengths of the molded article are decreased. Namely, for producing an excellent molded articles from the pre-expanded particles at a lower temperature (steam pressure), it is necessary that the percentage should be within the range where the crystal of $\beta$-form with a lower melting point gives sufficient to fuse each particle.

The percentage of the $\beta$-form is further preferably set to from 30 to 70% by weight because enough fusion is established and properties of the propylene resin can be exhibited most effectively.

Besides, the percentage of the $\beta$-form in the whole crystalline region is determined by a method wherein a percentage of an energy for melting the crystal of $\beta$-form with respect to an energy for melting the whole crystals is calculated from a DSC curve measured with a differential scanning calorimeter (DSC). Specifically, a base line of each endothermic peak of $\alpha$-form and $\beta$-form is determined on the basis of the rising point and the fallen point of the peak, and a ratio of the areas encompassed with the peak and base line is assumed to be a ratio of a melting energy of $\alpha$-form or $\beta$-form to a melting energy of all crystals, and the value is defined as the weight content.

The pre-expanded particle of the present invention has a melting peak of the $\beta$-form of the polypropylene resin at a lower temperature side (approximately 15° C. lower) of a melting peak of the $\alpha$-form. Though the production of the crystal of $\beta$-form is varied, as mentioned above, with kind, mount, blending method, blending condition of the $\beta$-crystalline-nucleating agent and the condition of the pre-expansion (cooling rate and the like), the pre-expanded particle of the present invention has a clear melting peak of the crystal of the $\beta$-form with a difference in its degree. The fact that the melting peak is derived from the melting of the crystal of $\alpha$-form or crystal of $\beta$-form is decided by referring to Kamiide, Nakamura, "Sen-i Gakkaishi", Vol. 25, No. 2 (1969), etc.

"The melting peak" used in the present invention is the peak obtained by means of DSC (manufactured by Seiko Instruments Inc.) when 10 mg of a sample is heated up under a nitrogen atomsphere at a rate of 10° C./min. And, the temperature at the top of the peak is called "the melting peak temperature."

The pre-expanded particle of the present invention has a melting peak of the crystal of $\beta$-form at a lower temperature side as well as a melting peak of the crystal of $\alpha$-form. Therefore, when an expansion-molded article is produced by using the pre-expanded particles, if heated up to a temperature at which the crystal of $\beta$-form of polypropylene resin is melted, the expansion-molded article having excellent fusion can be obtained. This reveals that the heating temperature at the expansion-molding can be lowered, and in the molding method within dies, the steam pressure can be lowered. For example, in case of polypropylene homopolymer and ethylene/propylene random copolymer, the heating temperature which was approximately 160° C. in conventional method can be lowered down to approximately 143° to 155° C. and, further, to approximately 143° to 146° C. Also, in case of ethylene/propylene random copolymer, the heating temperature which was approximately 145° C. in conventional method can be lowered down to approximately 130° to 140° C.

As the expansion-molding method by using the pre-expanded particles of the present invention, there can be adopted a conventionally well-known molding method within dies, namely the method wherein dies are charged with the pre-expanded particles, said dies can be closed but cannot be sealed, and then the pre-expanded particles are expanded and molded by heating with vapor. According to the present invention, heating temperature condition can be lowered greatly. As such a molding method within dies there are employed a method wherein after the dies are charged with the pre-expanded particles, the particles are compressed and then heat-molding is carried out, a method wherein the dies are charged with the pre-expanded particles under a pressurized condition and then heat-molding is carried out, a method wherein the dies are charged with the pre-expanded particles, after giving secondary expansion force thereto, and then heat-molding is carried out, a method wherein the dies are charged with the pre-expanded particles without giving an additional internal pressure and then heat-molding is carried out, and the like.

The molded article which is obtained through the molding method within dies by using the pre-expanded particles of the present invention produced from a polypropylene resin composition exhibits sufficiently the features such as rigidity and heat resistance which are the characteristics of the polypropylene resin and, further, is also superior in buffer property and strength.

Then, the present invention is explained on the basis of Examples and Comparative Examples and is not limited to only such Examples.

EXAMPLE 1

To 100 parts by weight of propylene homopolymer (MI= 5, melting peak by means of DSC (Seiko Instruments Inc.) being 165° C.), 0.2 part by weight of N,N'-dicyclohexyl-2,6-naphthalenedicarboxyamide (Shinnippon Rika Kabushiki Kaisha, Nujester NU 100) as the $\beta$-crystalline-nucleating agent was dry-blended. The obtained blended composition was melted and kneaded by means of a 50 mm uniaxial extruder at 200° C., and then extruded in the form of strand. Then, the extruded article was cooled in water bath and cut by means of a pelletizer to pelletize. When the melting point of the obtained polypropylene resin composition in the form of pellet was measured by means of DSC, an endothermic peak (peak percentage 95%) of the α-form was observed at 165° C. as a melting peak temperature, and an endothermic peak (peak percentage 5%) of the β-form was observed at 153° C. as a melting peak temperature. The percentage of the crystal of β-form in the whole crystalline region was 5% by weight. 100 Parts by weight of the obtained propylene resin composition particles, 2 parts by weight of basic tertiary calcium phosphate (Taihei Sangyo Kabushiki Kaisha), 0.05 parts by weight of sodium dodecylsulfonate (Kao Corporation) and 300 parts by weight of pure water were introduced into a sealed reaction bath to disperse these components in water and were heated up to 200° C. with agitation. At the time when reaching to 200° C., cooling was carried out at a rate of 10° C./min to 30° C. When the reaction bath was opened and a melting point of the polypropylene resin composition was measured by means of DSC. As a result an endothermic peak (peak percentage 15%) of the α-form was observed at 165° C. as a melting peak temperature, and an endothermic peak (peak percentage 85%) of the β-form was observed at 153° C. as a melting peak temperature. The percentage of the β-form in the whole crystalline region was 85% by weight.

The reaction bath was closed again and 9 parts by weight of isobutane was introduced, and the mixture was heated up to 150° C. with agitation. After adding further isobutane until a pressure in the system reaching to equilibrium at 20 kgf/cm², one end of the vessel was opened and the polypropylene resin composition together with water were released into atmosphere to obtain the pre-expanded particles of the present invention. When the melting point of the pre-expanded particle of the polypropylene resin composition was measured by means of DSC after drying for 20 hours at 80° C., an endothermic peak (peak percentage 55%) of the α-form was observed at 167° C. as a melting peak temperature and an endothermic peak (peak percentage 45%) of the β-form was observed at 153° C. as a melting peak temperature. The percentage of the β-form in the whole crystalline region was 45% by weight. After the pre-expanded particles were subjected to pressurizing for three hours in air of 80° C. and 8 kgf/cm² to endow with expansion force, the particles were packed in dies (290 mm×270 mm×60 mm) of an extruder (Toyo Kikai Kinzoku Kabushiki Kaisha, P-110) to obtain an expanded article by carrying out the molding under the conditions of a vapor pressure of 3 to 4 kgf/cm² and a molding temperature of 134° to 144° C.

The melting point by means of DSC, percentage of the β-form in the whole crystalline region and expansion ratio, of the pre-expanded particles, and the molding pressure when the pre-expanded particles were molded and ratio of fusion were measured. The results are shown in Table 1.

Besides, the surface of the molded article was smooth since the particles were sufficiently fused with each other and there were no space between the particles.

EXAMPLE 2

To 100 parts by weight of ethylene/propylene random copolymer (ethylene content 3%, the peak of the melting point by means of DSC (by Seiko Instruments Inc.) measurement 147° C.), 0.2 part by weight of the β-crystalline nucleating agent (by Shinnippon Rika Kabushiki Kaisha, NU 100) was dry-blended. The blended composition was melted and kneaded by means of a 50 mm unaxial extruder at 180° C. and then extruded in the form of strand. Then, the extruded article was cooled in water bath and cut by means of a pelletizer to pelletize. When the melting point of the obtained polypropylene resin composition in the form of pellet was measured by means of DSC, an endothermic peak was observed at 147° C. as a melting peak temperature. 100 Parts by weight of the obtained propylene resin composition particles, 2 parts by weight of basic tertiary calcium phosphate (Taihei Sangyo Kabushiki Kaisha), 0.05 parts by weight of sodium dodecylsulfonate (Kao Corporation) and 300 parts by weight of pure water were introduced into a sealed reaction bath to disperse these components in water and were heated up to 200° C. with agitation. At the time when reaching to 200° C., cooling was carried out at a rate of 10° C./min to 30° C. When the reaction bath was opened and a melting point of the polypropylene resin composition was measured by means of DSC. As a result, an endothermic peak (peak percentage 15%) of the α-form was observed at 147° C. as a melting peak temperature, and an endothermic peak (peak percentage 85%) of the β-form was observed at 135° C. as a melting peak temperature. The percentage of the β-form in the whole crystalline region was 85% by weight.

The reaction bath was closed again and 9 parts by weight of isobutane was introduced, and the mixture was heated up to 133° C. with agitation. After adding further isobutane until a pressure in the system reaching to equilibrium at 20 kgf/cm², to reach to equilibrium with one end of the vessel was opened and the polypropylene resin composition together with water was released into atmosphere to obtain the pre-expanded particles of the present invention. When the melting point of the pre-expanded particle of the polypropylene resin composition was measured by means of DSC after drying for 20 hours at 80° C., an endothermic peak (peak percentage 55%) of the α-form was observed 160° C. as a melting peak temperature and an endothermic peak (peak percentage 45%) of the β-form was observed at 135° C. as a melting peak temperature. The percentage of the β-form in the whole crystalline region was 45% by weight. After the pre-expanded particles were subjected to pressurizing for three hours with an air of 80° C. and 8 kgf/cm² to endow with expansion force, by the particles were packed in dies (290 mm×270 mm×60 mm) of an extruder (Toyo Kikai Kinzoku Kabushiki Kaisha, P-110) to carry out the molding under the conditions of a vapor pressure of 3 to 4 kgf/cm² and a molding temperature of 134° to 144° C. and the same measurements as in EXAMPLE 1. The results are shown in Table 1.

Besides, the surface of the molded article was smooth since the particles were sufficiently fused with each other and there were no space between the particles.

COMPARATIVE EXAMPLE 1

To 100 parts by weight of propylene homopolymer (MI= 5, the peak of the melting point by means of DSC (by Seiko Instruments Inc. ) measurement 165° C. ), 0.2 part by weight of the β-crystalline-nucleating agent (Shinnippon Rika Kabushiki Kaisha, NU 100) was dry-blended. The obtained blended composition was melted and kneaded by means of a 50 mm unaxial extruder at 200° C. and then extruded in the form of strand. Then, the extruded article was cooled in water bath and cut by means of a pelletizer to pelletize. When the melting point of the obtained polypropylene resin composition in the form of pellet was measured by means of DSC, an endothermic peak (percentage ratio 95%) of the α-form was observed at 165° C. as a melting peak temperature and an endothermic peak (peak percentage 5%) of the β-form was observed at 153° C. as a melting peak temperature. The percentage of the β-form in the whole crystalline region was 5% by weight. 100 Parts by weight of the obtained propylene resin composition particles, 2 parts by weight of basic tertiary calcium phosphate (Taihei Sangyo Kabushiki Kaisha), 0.05 parts by weight of sodium dodecylsulfonate (Kao Corporation), 300 parts by weight of pure water and 9 parts by weight of isobutane were introduced into a sealed reaction bath and were heated up to 145° C. with agitation. After adding further isobutane until a pressure in the system reaching to equilibrium at 20 kgf/cm², one end of the vessel was opened and the polypropylene resin composition together with water was released into atmosphere to obtain the pre-expanded particles of the present invention. When the melting point of the pre-expanded resin particle of the polypropylene resin composition was measured by means of DSC after drying for 20 hours at 80° C., an endothermic peak at 175° C. (peak percentage 20%) and an endothermic peak at 165° C. (peak percentage 80%) were observed. The percentage of the β-form in the whole crystalline region was 0% by weight.

After the pre-expanded particles were subjected to pressurizing for three hours with an air of 80° C. and 8 kgf/cm² to endow with expansion force, the particles were packed in dies (290 mm×270 mm×60 mm) of an extruder (Toyo Kikai Kinzoku Kabushiki Kaisha, P-110) to carry out the molding under the conditions of a vapor pressure of 4 to 5 kgf/cm² and a molding temperature of 144° to 153° C. and the same measurements as in EXAMPLE 1. The results are shown in Table 1.

Besides, the surface of the molded article has a rough surface since the fusion between particles were not sufficient and there remained space between the particles.

isobutane were introduced into a sealed reaction bath and were heated up to 145° C. with agitation. After adding further isobutane until a pressure in the system reaching to equilibrium at 20 kgf/cm², one end of the vessel was opened and the polypropylene resin composition together with water was released into atmosphere to obtain the pre-expanded particles of the present invention. When the melting point of the pre-expanded particle of the polypropylene resin composition was measured by means of DSC after drying at 80° C. for 20 hours, an endothermic peak (peak percentage 70%) was observed at 160° C. as a melting peak temperature and an endothermic peak (peak percentage 30%) was observed at 143° C. as a melting peak temperature. The percentage of the β-form in the whole crystalline region was 0% by weight.

After the pre-expanded particles were subjected to pressurizing for three hours with an air of 80° C. and 8 kgf/cm² to endow with expansion force by the particles were packed in a die (290 mm×270 mm×60 mm) of an extruder (Toyo Kikai Kinzoku Kabushiki Kaisha, P-110) to carry out the molding under the conditions of a vapor pressure of 3 to 4 kgf/cm² and a molding temperature of 134° to 144° C. and the same measurements as in EXAMPLE 1. The results are shown in Table 1.

Besides, the surface of the molded article has a somewhat rough surface since the fusion between particles were not sufficient a little and there remained space between the particles slightly.

TABLE 1

| | Melting point of the pre-expanded particle (°C.) | | Percentage of the β-form in the whole crystalline region (% by weight) | Expansion ratio of the pre-expanded particle (times) | Molding compression (kgf/cm²) | Ratio of fusion (%) |
| --- | --- | --- | --- | --- | --- | --- |
| | Peak at high temperature | Peak at low temperature | | | | |
| EXAMPLE 1 | 165 (α-form) | 153 (β-form) | 45 | 22 | 3.9 | 80 |
| EXAMPLE 2 | 160 (α-form) | 135 (β-form) | 45 | 24 | 3.0 | 90 |
| COMPARATIVE EXAMPLE 1 | 175 (α-form) | 165 (α-form) | 0 | 20 | 5.0 | 0 |
| COMPARATIVE EXAMPLE 2 | 160 (α-form) | 143 (α-form) | 0 | 19 | 3.9 | 80 |

COMPARATIVE EXAMPLE 2

To 100 parts by weight of ethylene/propylene random copolymer (ethylene content 3%, the peak of the melting point by means of DSC (by Seiko Instruments Inc.) measurement 147° C. ), 0.2 part by weight of the β-crystalline-nucleating agent (Shinnippon Rika Kabushiki Kaisha, NU 100) was dry-blended. The obtained blended composition was melted and kneaded by means of a 50 mm unaxial extruder at 180° C. and then extruded in the form of strand. Then, the extruded article was cooled in water bath and cut by means of a pelletizer to pelletize. When the melting point of the obtained polypropylene resin composition in the form of pellet was measured by means of DSC, an endothermic peak was observed at 147° C. as a melting peak temperature. 100 Parts by weight of the obtained propylene resin composition particles, 2 parts by weight of basic tertiary calcium phosphate ( Taihei Sangyo Kabushiki Kaisha), 0.05 parts by weight of sodium dodecylsulfonate (Kao Corporation), 300 parts by weight of pure water and 9 parts by weight of

EXAMPLE 3

Figure 1:
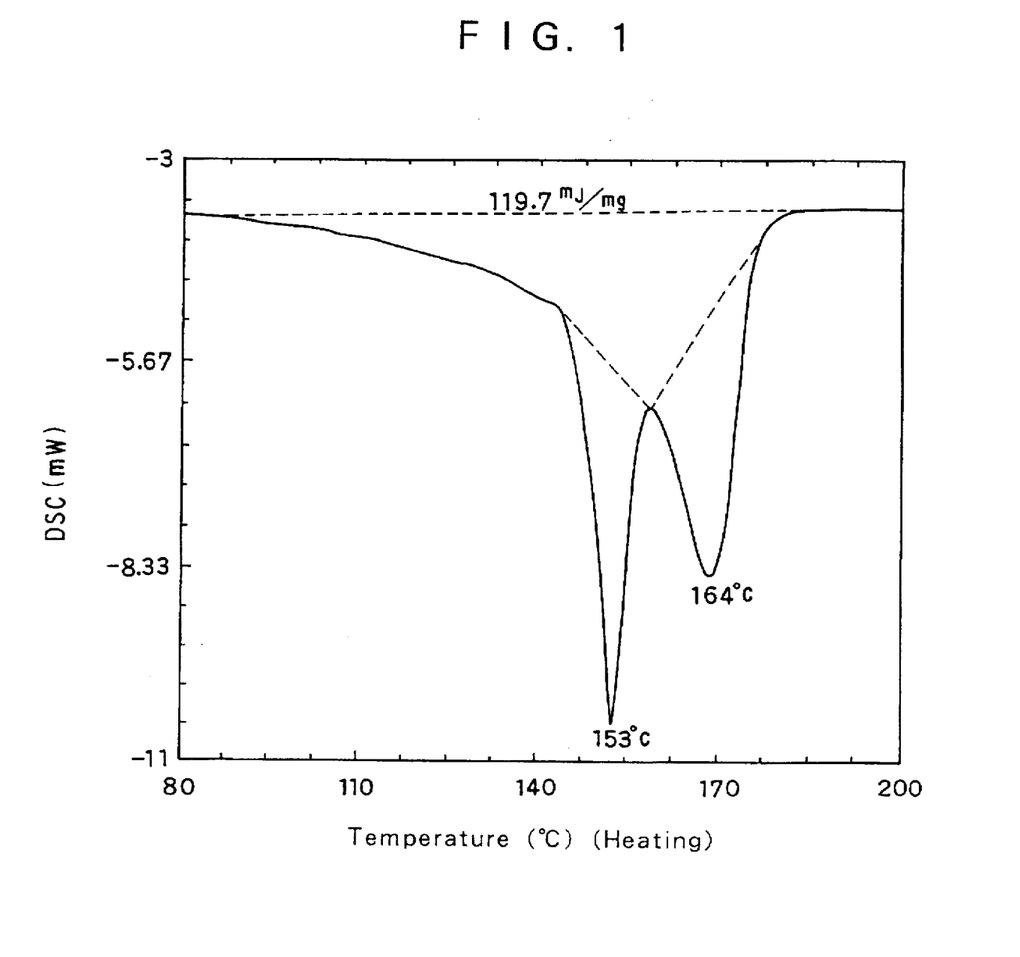
FIG. 1 is a DSC chart of the pre-expanded particle obtained in EXAMPLE 3.

To 100 parts by weight of propylene homopolymer (MI= 3, the peak of the melting point by means of DSC (Seiko Instruments Inc.) measurement 164° C.), 0.2 part by weight of the β-crystalline-nucleating agent (Shinnippon Rika Kabushi Kaisha, NU 100) was dry-blended. The obtained blended composition was melted by means of a 50 mm uniaxial extruder at 200° C. and then kneaded and extruded in the shape of strand. Then, the extruded article was cooled in water bath and cut by means of a pelletizer to pelletize. When the melting point of the obtained polypropylene resin composition was measured by means of DSC, an endothermic peak (peak percentage 95%) of the α-form was observed at 164° C. as a melting peak temperature and an endothermic peak (peak percentage 5%) of the β-form was observed at 153° C. as a melting peak temperature. 100 Parts by weight of the obtained propylene resin composition particles, 3 parts by weight of basic tertiary calcium phosphate (Taihei Sangyo Kabushiki Kaisha), 0.075 parts by weight of sodium dodecylsulfonate (Kao Corporation), 300 parts by weight of pure water and 9 parts by weight of isobutane were introduced into a sealed reaction bath to disperse these components in water and were heated with agitation up to 175° C. at which the crystal within the pellet were melted completely. After reaching to 175° C., cooling was carried out. By cooling to 135° C. which was not less than the crystallization temperature (133° C.) and with keeping the pressurized condition at 12 kgf/cm², one end of the vessel was opened and the polypropylene resin composition together with water was released into atmosphere to obtain the pre-expanded particles of the present invention. When the melting point of the pre-expanded particles of the polypropylene resin composition particles was measured by means of DSC after drying for 20 hours at 80° C., an endothermic peak (peak percentage 45%) of the α-form was observed at 163° C. as a melting peak temperature. This DSC chart is shown in FIG. 1.

After this pre-expanded particles were subjected to pressurizing for one hour with an air of 80° C. and 7 kgf/cm² to endow expansion force, the particles were introduced in dies (290 mm×270 mm×60 mm) of an extruder ( Toyo Kikai Kinzoku Kabushiki Kaisha: 9-110) to obtain an expanded article by carrying out the molding under the conditions of a vapor pressure of 3 to 4 kgf/cm² and a molding temperature of 134° to 144° C. The results with respect to DSC melting peak temperature percentage of the β-form in the whole crystalline region, expansion ratio of the pre-expanded particles, closed cell ratio, and ratio of fusion of a molded article are shown in Table 2.

Besides, the surface of the molded article was smooth since the particles were sufficiently fused with each other and there were no space between the particles.

EXAMPLE 4

To 100 parts by weight of propylene homopolymer (MI= 3, the peak of the melting point by means of DSC (Seiko Instruments Inc.) measurement 164° C.), 0.2 part by weight of dianilide adipate as the β-crystalline-nucleating agent was dry-blended. The obtained blended composition was melted by means of a 50 mm uniaxial extruder at 200° C. and then kneaded and extruded in the form of strand. Then, the extruded article was cooled in water bath and cut by means of a pelletizer to pelletize. When the melting point of the obtained polypropylene resin composition was measured by means of DSC, an endothermic peak (peak percentage 95%) of the α-form was observed at 164° C. as a melting peak temperature and an endothermic peak (peak percentage 5%) of the β-form was observed at 153° C. as a melting peak temperature. The percentage of the β-form in the whole crystalline region was 5% by weight. 100 Parts by weight of the obtained propylene resin composition particles, 3 parts by weight of basic tertiary calcium phosphate (Taihei Sangyo Kabushiki Kaisha), 0.75 parts by weight of sodium dodecylsulfonate (Kao Corporation), 300 parts by weight of pure water and 9 parts by weight of isobutane were introduced into a sealed reaction bath to disperse these components in water and were heated with agitation up to 175° C. at which the crystal within the pellet were melted completely. After reaching to 175° C., cooling was carried out. By cooling to 135° C. which was not less than the crystallization temperature (133° C.) and, with keeping the pressurized condition at 12 kgf/cm², one end of the vessel was opened and the polypropylene resin composition together with water was released into atmosphere to obtain the pre-expanded particles. When the melting point of the pre-expanded particles of the polypropylene resin composition particles was measured by means of DSC after drying for 20 hours at 80° C., an endothermic peak (peak percentage 60%) of the α-form was observed at 164° C. as a melting peak temperature and an endothermic peak (peak percentage 40%) of the β-form was observed at 144° C. as a melting peak temperature.

After these pre-expanded particles were subjected to pressurizing for one hour with an air of 80° C. and 7 kgf/cm² to endow with expansion force, the particles were introduced in dies (290 mm×270 mm×60 mm) of an extruder (Toyo Kikai Kinzoku Kabushiki Kaisha, P-110) to carry out the molding under the conditions of a vapor pressure of 3 to 4 kgf/cm² and a molding temperature of 134° to 144° C. The test results with respect to DSC melting peak temperature, percentage of the β-form in the whole crystalline region, expansion ratio of the pre-expanded particles, closed cell ratio and ratio of fusion of a molded article were shown in Table 2.

Besides, the surface of the molded article was smooth since the particles were sufficiently fused with each other and there were no space between the particles.

EXAMPLE 5

To 100 parts by weight of an ethylene/propylene random copolymer (MI=4, ethylene content 3%, the peak of the melting point by means of DSC (Seiko Instruments Inc.) measurement 147° C.), 0.2 part by weight of the β-crystalline-nucleating agent (Shinnippon Rika Kabushiki Kaisha, NU 100) was dry-blended. The obtained blended composition was melted and then kneaded by means of a 50 mm uniaxial extruder at 200° C. and extruded in the form of strand. Then, the extruded article was cooled in water bath and cut by means of a pelletizer to pelletize. When the melting point of the obtained polypropylene resin composition was measured by means of DSC, an endothermic peak was observed at 147° C. as a melting peak temperature. 100 Parts by weight of the obtained propylene resin composition particles, 3 parts by weight of basic tertiary calcium phosphate (Taihei Sangyo Kabushiki Kaisha), 0.075 parts by weight of sodium dodecylsulfonate ( Kao Corporation), 300 parts by weight of pure water and 9 parts by weight of isobutane were introduced into a sealed reaction bath to disperse these components in water and were heated up to 170° C. with agitation. After reaching to 170° C., cooling was carried out. By cooling to 135° C. which was not less than the crystallization temperature (130° C.) and with keeping the pressurized condition at 12 kgf/cm², one end of the vessel was opened and the polypropylene resin composition together with water was released into atmosphere to obtain the pre-expanded particles. When the melting point of the pre-expanded particles of the polypropylene resin composition particles was measured by means of DSC after drying for at 80° C. 20 hours, an endothermic peak (peak percentage 55%) of the α-form was 147° C. as a melting peak temperature and an endothermic peak (peak percentage 45%) of the β-form was observed at 127° C. as a melting peak temperature.

After these pre-expanded particles were subjected to pressurizing for one hour with an air of 80° C. and 7 kgf/cm² to endow expansion force the particles were introduced in dies (290 mm×270 mm×60 mm) of an extruder (Toyo Kikai Kinzoku Kabushiki Kaisha: P-110) to carry out the molding under the conditions of a vapor pressure of 2 to 3 kgf/cm² and a molding temperature of 121° to 134° C. and the same measurements as in EXAMPLE 1. The results are shown in Table 2.

Besides, the surface of the molded article was smooth since the particles were sufficiently fused with each other and there were no space between the particles.

EXAMPLE 6

To 100 parts by weight of propylene homopolymer (MI= 3, the peak of the melting point by means of DSC (Seiko Instruments Inc.) measurement is 164° C.), 0.2 part by weight of the β-crystalline-nucleating agent (Shinnippon Rika Kabushiki Kaisha, NU 100) was dry-blended. The obtained blended composition was melted and kneaded by means of a 50 mm uniaxial extruder at 200° C. and then extruded in the form of strand. Then, the extruded article was cooled in water bath and cut by means of a pelletizer to pelletize. When the melting point of the obtained polypropylene resin composition was measured by means of DSC, an endothermic peak (peak percentage 95%) of the α-form was observed at 164° C. as a melting peak temperature and an endothermic peak (peak percentage 5%) of β-form was observed at 153° C. as a melting peak temperature. 100 Parts by weight of the obtained propylene resin composition particles, 3 parts by weight of basic tertiary calcium phosphate (Taihei Sangyo Kabushiki Kaisha), 0.075 parts by weight of sodium dodecylsulfonate (Kao Corporation), 300 parts by weight of pure water and 25 parts by weight of isobutane were introduced into a sealed reaction bath to disperse these components in water and were heated with agitation up to 175° C. at which the crystal within the pellet were melted completely. After reaching to 175° C., cooling was carried out. By cooling to 135° C. which was not less than the crystallization temperature (133° C.) and with keeping the pressurized condition at 20 kgf/cm², one end of the vessel was opened and the polypropylene resin composition together with water was released into atmosphere to obtain the pre-expanded particles. When the melting point of the pre-expanded particles of the polypropylene resin composition particles was measured by means of DSC after drying at 80° C. for 20 hours, an endothermic peak (peak percentage 75%) of the α-form was observed at 163° C. as a melting peak temperature and an endothermic peak (peak percentage 25%) of the β-form was observed at 143° C. as a melting peak temperature.

After these pre-expanded particles were subjected to pressurizing for one hour with an air of 80° C. and 7 kgf/cm² to endow with expansion force, by the particles were introduced in dies (290 mm×270 mm×60 mm) of an extruder (Toyo Kikai Kinzoku Kabushiki Kaisha: P-110) to carry out the molding under the conditions of a vapor pressure of 3 to 4 kgf/cm² and a molding temperature of 134° to 144° C. and the same measurements as in EXAMPLE 1. The results with respect to DSC melting peak temperature, the percentage of the β-form in the whole crystalline region, expansion ratio of the pre-expanded particles, surface properties and the ratio of fusion of a molded article are shown in Table 2.

Besides, the surface of the molded article was smooth since the particles were sufficiently fused with each other and there were no space between the particles.

COMPARATIVE EXAMPLE 3

Propylene homopolymer (MI=3, the peak of the melting point by means of DSC (Seiko Instruments Inc. measurement) 164° C.) was melted and kneaded by means of a 50 mm unaxial extruder at 200° C. and then extruded in the form of strand and was cooled in water bath and cut by means of a pelletizer to pelletize. When the melting point of the obtained polypropylene resin composition was measured by means of DSC, an endothermic peak of the α-form of which the peak of the melting point was observed at 164° C. as a melting peak temperature. 100 Parts by weight of the obtained propylene resin composition particles, 3 parts by weight of basic tertiary calcium phosphate (Taihei Sangyo Kabushiki Kaisha), 0.075 parts by weight of sodium dodecylsulfonate (Kao Corporation), 300 parts by weight of pure water and 9 parts by weight of isobutane were introduced into a sealed reaction bath to disperse these components in water and heated with agitation up to 175° C. at which the crystal within the pellet are melted completely. After reaching to 175° C., cooling was carried out to 135° C. which was not less than the crystallization temperature (130° C.) and with keeping a pressurized condition at 12 kgf/cm², one end of the vessel was opened and the polypropylene resin composition together with water was released into atmosphere to obtain the pre-expanded particles. When the melting point of the pre-expanded particle of the polypropylene resin composition was measured by means of DSC after drying for 20 hours at 80° C., an endothermic peak (peak ratio 100%) of the α-form was observed at 164° C. as a melting peak temperature and an endothermic peak of the β-form was not observed. The percentage of the β-form in the whole crystalline region was 0% by weight.

After these pre-expanded particles were subjected to pressurizing for one hour with an air of 80° C. and 7 kgf/cm² to endow with expansion force, the particles were introduced in dies (290 mm×270 mm×60 mm) of an extruder (Toyo Kikai Kinzoku Kabushiki Kaisha, P-110) to carry out the molding under the conditions of a vapor pressure of 4 to 5 kgf/cm² and a molding temperature of 144° to 153° C. The results with respect to DSC melting peak temperature, percentage of the β-form in the whole crystal, expansion ratio of the pre-expanded particles, closed cell ratio and ratio of fusion of a molded article are shown in Table 2.

Besides, the surface of the molded article has a rough surface since the particles were not sufficiently fused with each other and there were space between the particles.

COMPARATIVE EXAMPLE 4

Figure 2:
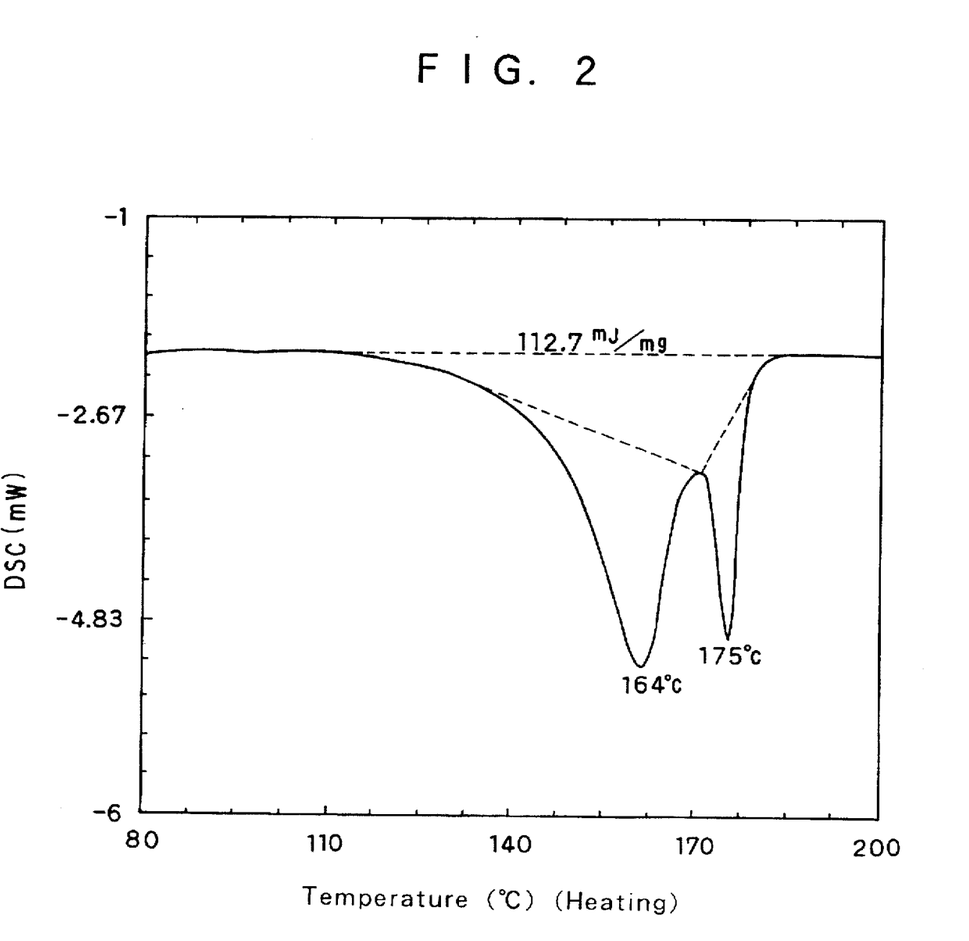
FIG. 2 is a DSC chart of the pro-expanded particle obtained in COMPARATIVE EXAMPLE 4.

To 100 parts by weight of a propylene homopolymer (MI=3, the peak of melting point by means of DSC (Seiko Instruments Inc.) measurement is 164° C.), 0.2 part by weight of the β-crystalline-nucleating agent (Nippon Rika Kabushiki Kaisha, NU 100) was dry-blended. The obtained blended composition was melted and kneaded by means of a 50 mm uniaxial extruder at 200° C. and then extruded in the form of strand. Then, the extruded article was cooled in water bath and cut by means of a pelletizer to pelletize. When the melting point of the obtained polypropylene resin composition was measured by means of DSC, an endothermic peak (peak percentage 95%) of the α-form was observed at 164° C. as a melting peak temperature and an endothermic peak (peak percentage 5%) of the β-form was observed at 153° C. as a melting peak temperature. 100 Parts by weight of the obtained propylene resin composition particles, 2 parts by weight of basic tertiary calcium phosphate (Taihei Sangyo Kabushiki Kaisha), 0.05 parts by weight of sodium dodecylsulfonate (Kao Corporation), 300 parts by weight of pure water and 9 parts by weight of isobutane were introduced and heated up to 163° C. with agitation. After adding further isobutane until at pressure in the system reaching to equilibrium at 19 kgf/cm², one end of the vessel was opened and the polypropylene resin composition together with water was released into atmosphere to obtain the pre-expanded particles. When the melting point of the pre-expanded particles of the polypropylene resin composition particles was measured by means of DSC after drying at 80° C. for 20 hours, an endothermic peak (peak percentage 20%) of the α-form was observed at 175° C. as a melting peak temperature and an endothermic peak (peak percentage 80%) of the β-form was observed at 164° C. as a melting peak temperature. This DSC chart is shown in FIG. 2.

After these pre-expanded particles were subjected to pressurizing for one hour with air of 80° C. and 7 kgf/cm² to endow with expansion force, by the particles were introduced in dies (290 mm×270 mm×60 mm) of an extruder (Toyo Kikai Kinzoku Kabushiki Kaisha: P-110) to carry out the molding under the conditions of a vapor pressure of 4 to 5 kgf/cm² and a molding temperature of 144° to 153° C. and the same measurements as in EXAMPLE 1. The results are shown in Table 2.

Besides, the surface of the molded article has a rough surface since the particles were not sufficiently fused with each other and there were space between the particles.

COMPARATIVE EXAMPLE 5

To 100 parts by weight of Propylene homopolymer (MI= 4, the peak of the melting point by means of DSC (Seiko Instruments Inc.) measurement 165° C.), 0.2 part by weight of the β-crystalline-nucleating agent (Shinnippon Rika Kabushiki Kaisha, NU 100) was dry-blended. The blended composition was melted and kneaded by means of a 50 mm unaxial extruder at 200° C. and then extruded in the form of strand. Then, the extruded article was cooled in water bath and cut by means of a pelletizer to pelletize. When the melting point of the obtained polypropylene resin composition was measured by means of DSC, an endothermic peak was observed at 147° C. as a melting peak temperature. 100 Parts by weight of the obtained propylene resin composition particles, 2 parts by weight of basic tertiary calcium phosphate (Taihei Sangyo Kabushiki Kaisha), 0.5 parts by weight of sodium dodecylsulfonate (Kao Corporation), 300 parts by weight of pure water and 9 parts by weight of isobutane were introduced and heated up to 145° C. with agitation. After adding further isobutane until a pressure in the system reaching to equilibrium at 20 kgf/cm², one end of the vessel was opened and the polypropylene resin composition together with water was released into atmosphere to obtain the pre-expanded particles. When the melting point of the pre-expanded particle of the polypropylene resin composition particle was measured by means of DSC after drying for 20 hours at 80° C., an endothermic peak (peak percentage 70%) of the α-form was observed at 160° C. as a melting peak temperature and an endothermic peak (peak percentage 30%) of α-form were observed at 143° C. as a melting peak temperature.

After these pre-expanded particles were subjected to pressurizing for one hour with an air of 80° C. and 7 kgf/cm² to endow with expansion force, by the particles were introduced dies (290 mm×270 mm×60 mm) of an extruder (Toyo Kikai Kinzoku Kabushiki Kaisha, P-110) to carry out the molding under the conditions of a vapor pressure of 2 to 3 kgf/cm² and a molding temperature of 121° to 134° C. and the same measurements as in EXAMPLE 1. The results are shown in Table 2.

Besides, the surface of the molded article has a rough surface since the particles were not sufficiently fused with each other and there were space between the particles.

Also, as described above, though there are some cases where the conventional pre-expanded particle have two melting peak temperatures, these are derived from one melting peak temperature of the α-crystal which is divided in two. As clear from the DSC chart (FIG. 2) of the pre-expanded particles obtained in COMPARATIVE EXAMPLE 4, a new melting peak temperature (175° C.) appears at higher temperature side of the original melting peak temperature (164° C.).

On the other hand, in case where two melting peak temperatures appear by the yield of the β-form, as shown in the DSC chart (FIG. 1) of the pre-expanded particle obtained in EXAMPLE 3, the melting peak temperature (144° C.) of the β-form appears at lower temperature side of the original melting peak temperature.

TABLE 2

| | Melting point of the pre-expanded particle (°C.) | | Percentage of the β-form in the whole crystalline region (% by weight) | Expansion ratio of the pre-expanded particle (times) | Closed cell rate of the pre-expanded particle (%) | Molding compression (kgf/cm²) | Ratio of fusion (%) |
|---|---|---|---|---|---|---|---|
| | Peak at high temperature | Peak at low temperature | | | | | |
| EXAMPLE 3 | 164 (α-form) | 144 (β-form) | 45 | 22 | 97 | 3.8 | 80 |
| EXAMPLE 4 | 164 (α-form) | 144 (β-form) | 40 | 27 | 96 | 3.8 | 80 |
| EXAMPLE 5 | 147 (α-form) | 127 (β-form) | 45 | 24 | 98 | 2.5 | 80 |
| EXAMPLE 6 | 163 (α-form) | 143 (β-form) | 25 | 50 | 90 | 3.8 | 80 |
| COMPARATIVE EXAMPLE 3 | 164 (α-form) | — | 0 | 21 | 96 | 5.0 | 10 |
| COMPARATIVE EXAMPLE 4 | 175 (α-form) | 164 (α-form) | 0 | 20 | 98 | 5.0 | 10 |
| COMPARATIVE EXAMPLE 5 | 160 (α-form) | 143 (α-form) | 0 | 19 | 99 | 3.0 | 40 |

INDUSTRIAL APPLICABILITY

The pre-expanded comprising particles comprising a polypropylene resin and a β-crystalline-nucleating agent for the present invention can be molded within dies at low temperature (steam of low pressure) and is economically advantageous since a larger amount of the β-form is contained compared to the conventional polypropylene resin pre-expanded particles. Further, a molded article through molding within dies obtained from the pre-expanded particles of the polypropylene resin composition exhibits buffer property, strength, rigidity, heat resistance which are characteristics of the polypropylene resin composition.

We claim:

1. Pre-expanded particles comprising a polypropylene resin and at least one kind of the β-form-nucleating agent selected from a group consisting of dicarboxylic acid diamide compounds, diamine diamide compounds and amino acid diamide compounds, wherein the percentage of the β-form in the whole crystalline region is 5 to 100% by weight.

2. The pre-expanded particles according to claim 1 wherein the polypropylene resin is propylene homopolymer, copolymer of propylene and ethylene and/or α-olefin, or mixture thereof.

3. The pre-expanded particles according to claim 2 wherein the polypropylene resin is propylene-ethylene copolymer or a mixture of the copolymer and propylene homopolymer.

4. The pre-expanded particles according to claim 2 wherein α-olefin is at least one kind selected from a group consisting of butene-1, isobutene, pentene-1 and hexene-1.

5. The pre-expanded particles according to any one of claims 1 to 4 wherein the polypropylene resin has a melt index of 0.1 to 10 g/min which is measured based on the testing method of ASTMD 1238.

6. The pre-expanded particles according to any one of claims 1 to 4 wherein the expansion ratio is 5 to 100 times.

7. The pre-expanded particles according to any one of claims 1 to 4 wherein the closed cell ratio is not less than 60%.

8. A process for producing polypropylene resin pre-expanded particle containing a crystal of β-form, wherein a percentage of the β-form in the whole crystalline region is 5 to 100% by weight, comprises producing polypropylene resin particles containing a β-crystalline-nucleating agent and obtained by introducing at least one kind of the β-crystalline-nucleating agent selected from the group consisting of quinacridone-type compounds, dicarboxylic acid-type diamide compounds, diamine-type diamide compounds and amino acid-type diamide compounds into a polypropylene resin, heating an aqueous dispersion comprising the polypropylene resin particle containing the β-crystalline-nucleating agent, a dispersing agent and a volatile foaming agent in a pressure-resistive vessel to substantially melt the crystal of the polypropylene resin in the resin particles, then, maintaining the aqueous dispersion within a temperature range from a temperature of not higher than a temperature at which the molten particles have a melt viscosity enough to give a closed cell ratio of the pre-expanded particles of not less than 60% to a temperature of higher than a temperature at which the molten particles are crystallized, releasing the aqueous dispersion into atmosphere where a pressure is below a vapor pressure of the volatile foaming agent while maintaining the temperature and pressure in the pressure-resistive vessel within a range of a cool temperature and under a pressure above the vapor pressure of the volatile foaming agent.

9. The producing method according to claim 8 wherein the polypropylene resin is propylene homopolymer, copolymers of propylene and ethylene and/or α-olefin, or a mixture of at least one kind of the copolymers and propylene homopolymer.

10. The producing method according to claim 9 wherein the polypropylene resin is propylene-ethylene copolymer.

11. The producing method according to claim 9 wherein β-olefin is at least one kind selected from a group consisting of butene-1, isobutene, pentene-1 and hexene-1.

12. The producing method according to any one of claim 8 to 11 wherein the polypropylene resin has a melt index of 0.1 to 10 g/min which is measured based on the testing method of ASTMD 1238.

13. The producing method according to any one of claims 8 to 11 wherein the expansion ratio of the pre-expanded particles is 5 to 100 times.

* * * * *